Jan. 4, 1927.
H. W. REYNOLDS ET AL
OIL CUP
Filed Nov. 13, 1923    2 Sheets-Sheet 2
1,613,482
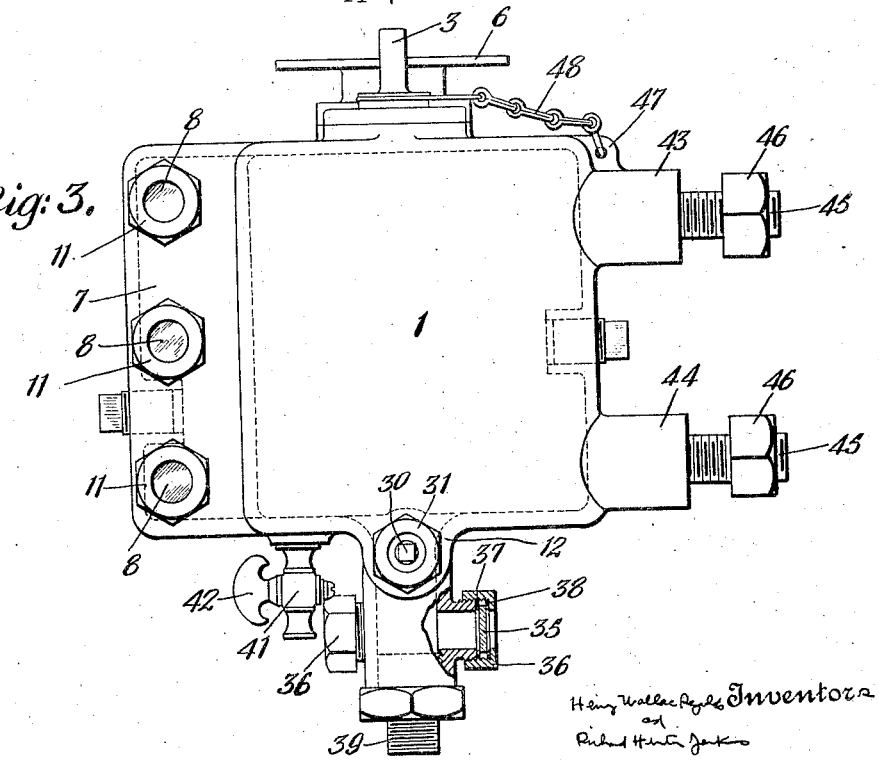

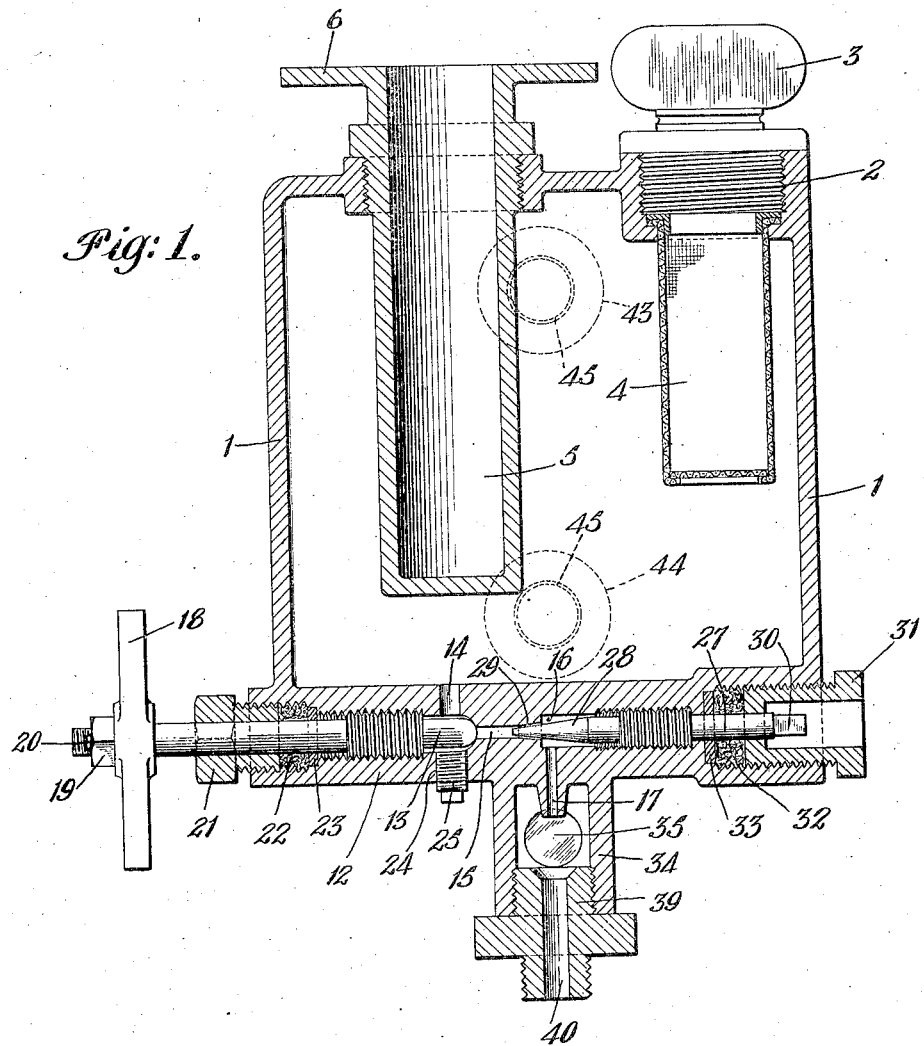

Patented Jan. 4, 1927.

1,613,482

UNITED STATES PATENT OFFICE.

HENRY WALLACE REYNOLDS AND RICHARD HUNTER JENKINS, OF ROANOKE, VIRGINIA, ASSIGNORS TO NATHAN MANUFACTURING COMPANY, OF NEW YORK, N. Y.

OIL CUP.

Application filed November 13, 1923. Serial No. 674,454.

The invention herein described and claimed relates generally to oil cups, the particular form shown in the drawings being especially well adapted for lubricating jack shafts of electric locomotives. The particular advantages of our type of oil cup are the feed cut-off valve and feed control spindle, means for ascertaining amount and rate of feed of oil, provisions for warming the oil, compact and readily attachable construction, economy of manufacture and durability. Other merits will appear from the following description when considered in conjunction with the drawings.

Fig. 1 is a vertical sectional view on line A—A of Fig. 2; Fig. 2 is a top view with two of the observation glass chambers in section; and Fig. 3 is a side view with one of the side glass chambers in section.

Oil cup body 1 of preferably circular form has filling opening 2 closable by threaded filling plug 3, strainer 4 depending from opening 2. Circular threaded pocket 5 screws in top of body 1 in order that an electric heating coil, not shown, may be inserted therein to warm the oil in cold weather, circular flange 6 at top of pocket providing a seat for such coil. Bay-like extension 7 contains three oppositely placed pairs of windows, each consisting of glass 8 pressed against suitable washers 9, 10, by nut 11.

Lower cylindrical base 12 is preferably integral with body 1 and is interiorly threaded for the reception of cut-off valve 13 controlling admission of oil through conduit 14 to bore 15 and thence through passages 16, 17. Operating handle 18 of cut-off valve 13 is secured by nut 19 with pin 20. Packing gland 21 contains suitable packing 22 with washer 23 to prevent oil passage. Opening 24 with plug 25 beneath conduit 14 enables convenient access thereto for inspection and cleaning. Base 12 is also interiorly threaded for reception of threaded feed control spindle 27, provided with a conical point 28, seating at 29 in base 12, the socket end 30 of spindle 27 being square and located within packing gland 31, so that a special socket wrench is required for the purpose of turning same. Packing gland 31 screws within body 1 and contains suitable packing 32 with washer 33 to prevent oil passage.

Sight feed chamber 34, preferably integral with base 12, has on opposite sides windows consisting of glass plates 35 pressed by nuts 36 against washers 37, 38, made of suitable packing material, such as rubber or fiber. Shank 39 with outlet passage 40 screws into sight feed chamber 34 and is exteriorly threaded for convenient attachment. Drain valve 41 with handle 42 is adapted to empty body 1.

Upper and lower supporting lugs 43, 44 are preferably cast integral with body 1, each accommodating a supporting stud 45 so that a supporting bracket, not shown, may be slipped over the studs 45 and held solidly against the faces of lugs 43, 44, by means of nuts 46, the supporting bracket being secured to a wall or floor, as desired. Upper supporting lug 43 has projection 47 to which chain 48 may be attached, other end of chain being connected to filling plug 3.

The oil cup body may be filled by closing cut-out valve 13 and feed central spindle 27, filling plug 3 being then removed and oil poured through opening 2 into strainer 4. Cut-out valve 13 is then opened, thus admitting oil through conduit 14 into bore 15. Feed control spindle 27 is then opened by means of a special socket wrench until the desired oil feed is seen through either glass 35 in sight feed chamber 34. When it is desired to stop oil feed for a substantial period, as for example when our oil cup is employed upon a locomotive which is held on a siding, cut-out valve 13 is closed. Flow of oil to bore 15 is thereby stopped, but as feed control spindle 27 remains set, the desired rate of feed will recommence as soon as cut-out valve 13 has been reopened.

It is obvious from the foregoing that many variations may be made from the details and arrangement of the particular form of our invention herein illustrated and described without departing from the spirit and scope of our invention.

We claim:

1. In an oil cup construction, a relatively thick cup base portion having an oil delivery passageway extending therethrough, said oil delivery passageway including a horizontally extending portion, a quick-acting cut-off valve arranged in cooperating relation with the inflow end of said horizontal portion of the passageway, and a needle type flow regulating valve arranged in cooperating relation to the outflow end of the horizontal portion of the passageway.

2. In an oil cup, the base portion of which is provided with an oil delivery passageway including a horizontally extending section, a manually operable cut-off valve in controlling relation to the receiving end of the horizontal section of said passageway, and a flow regulating valve in controlling relation to the delivery end of the horizontal section of said passageway, said flow regulating valve being operable only by the use of a special tool.

3. In an oil cup construction, a relatively thick cup base portion having an oil delivery passageway therethrough, said oil delivery passageway including a horizontally extending portion, a quick-acting manually operable valve arranged in cooperative relation with the inflow end of said horizontal portion of the passageway as a valve seat, and a needle type flow regulating valve arranged in cooperative relation to the outflow end of the horizontal portion of the passageway as a valve seat, said flow regulating valve being capable of operation only by the use of a special tool.

HENRY WALLACE REYNOLDS.
RICHARD HUNTER JENKINS.